United States Patent
Louvigne et al.

(10) Patent No.: US 10,401,192 B2
(45) Date of Patent: Sep. 3, 2019

(54) METHOD FOR COUNTING EVENTS OCCURRING DURING A DURATION T AND ASSOCIATED MECHANICAL EVENT COUNTERS

(71) Applicants: ETAT FRANCAIS REPRESENTE PAR LE DELEGUE GENERAL POUR L'ARMEMENT, Paris (FR); SILMACH, Besancon (FR)

(72) Inventors: Pierre-Francois Louvigne, Bourg la Reine (FR); Patrice Minotti, Gennes (FR); Vianney Sadoulet, Venise (FR); Pascal Girardin, Besancon (FR); Charles Haye, Chaucenne (FR)

(73) Assignees: ETAT FRANCAIS REPRESENTE PAR LE DELEGUE GENERAL POUR L'ARMEMENT, Paris (FR); SILMACH, Besancon (FR)

( * ) Notice: Subject to any disclaimer, the term of this patent is extended or adjusted under 35 U.S.C. 154(b) by 0 days.

(21) Appl. No.: 15/510,321

(22) PCT Filed: Sep. 10, 2015

(86) PCT No.: PCT/FR2015/000181
§ 371 (c)(1),
(2) Date: Mar. 10, 2017

(87) PCT Pub. No.: WO2016/038256
PCT Pub. Date: Mar. 17, 2016

(65) Prior Publication Data
US 2017/0261340 A1   Sep. 14, 2017

(30) Foreign Application Priority Data
Sep. 10, 2014   (FR) .................................. 14 02022

(51) Int. Cl.
    *G01D 5/04*      (2006.01)
    *G01D 5/245*     (2006.01)
    *G01D 5/26*      (2006.01)

(52) U.S. Cl.
    CPC ............. *G01D 5/04* (2013.01); *G01D 5/2452* (2013.01); *G01D 5/264* (2013.01)

(58) Field of Classification Search
    CPC ......... G01D 5/04; G01D 5/2452; G01D 5/264
    (Continued)

(56) References Cited

U.S. PATENT DOCUMENTS 3,715,645 A * 2/1973 Viret ................... G01B 11/005
                                              318/603
5,218,769 A * 6/1993 Tranchon ............. G01D 5/3473
                                              33/1 N (Continued)

FOREIGN PATENT DOCUMENTS

DE       198 21 467 A1   11/1999
EP         546907 A1      6/1993
(Continued)

OTHER PUBLICATIONS

International Search Report, dated Aug. 8, 2015, from corresponding PCT application.
FR Search Report, dated Jun. 1, 2015, from corresponding FR application.

* cited by examiner

*Primary Examiner* — John H Le
(74) *Attorney, Agent, or Firm* — Young & Thompson

(57) ABSTRACT

Disclosed is a method for counting events occurring during a period T carried out by a mechanical counter including two toothed wheels with the same pitch, the occurrence of an event causing the rotation of each wheel by an angle corresponding to the pitch of the teeth thereof, the method including: counting or calculating, for each wheel at the end of T, the difference in the number of teeth between the initial (Continued)

and final position thereof, the step being at least partially carried out either by an optical unit, requiring the presence on each wheel of at least one marker, or by a unit for measuring the angular displacement of each wheel and associated calculation unit; and calculating the number of occurred events N in accordance with the difference between the values counted or measured and in accordance with the number of teeth of the wheels.

16 Claims, 8 Drawing Sheets

(58) Field of Classification Search
USPC .......... 702/176; 73/862.53; 324/207.21, 714
See application file for complete search history.

(56) References Cited

U.S. PATENT DOCUMENTS

| | | |
|---|---|---|
| 5,399,981 A | 3/1995 | Vermesse |
| 9,140,584 B2 | 9/2015 | Louvigne et al. |
| 2002/0011840 A1 | 1/2002 | Li |
| 2014/0060208 A1 | 3/2014 | Louvigne et al. |

FOREIGN PATENT DOCUMENTS

| | | |
|---|---|---|
| EP | 1 998 144 A2 | 12/2008 |
| FR | 2 974 410 A1 | 10/2012 |
| WO | 2012/143627 A1 | 10/2012 |

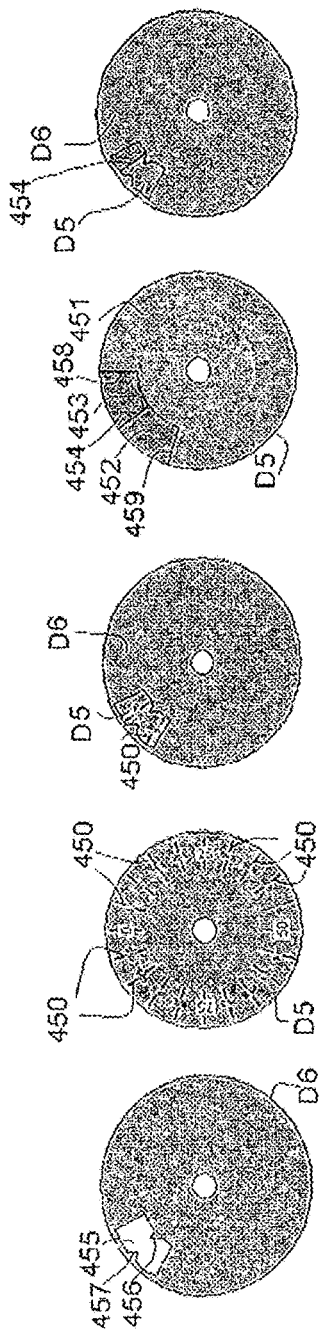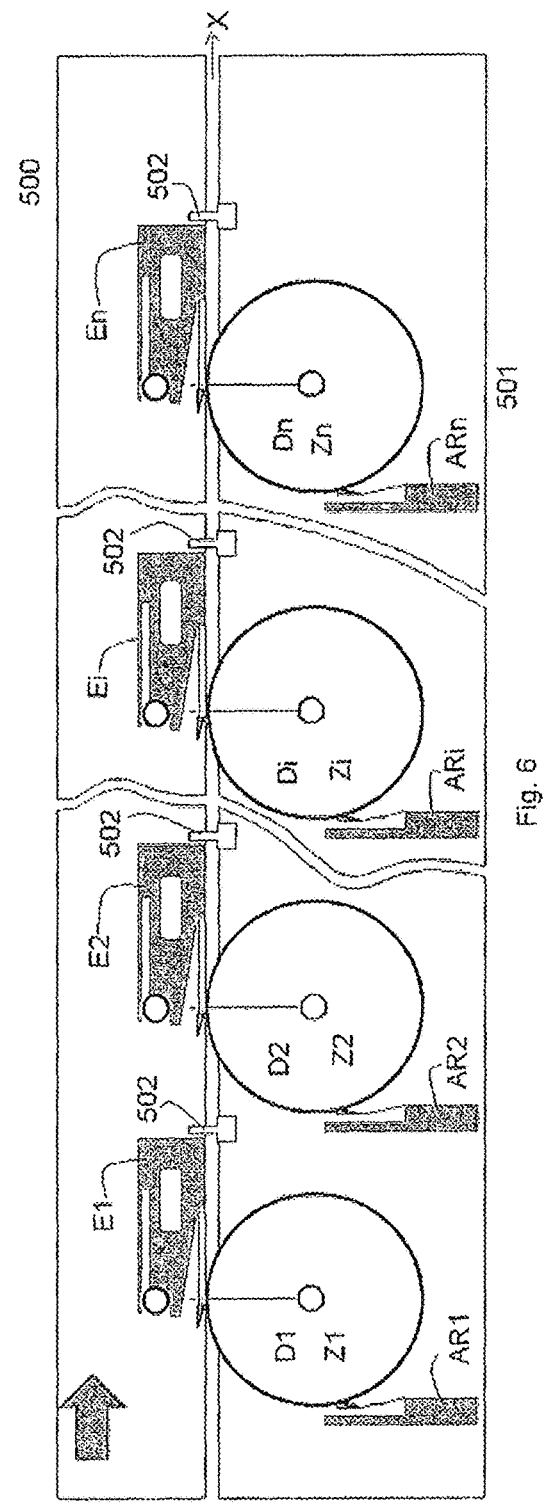

METHOD FOR COUNTING EVENTS OCCURRING DURING A DURATION T AND ASSOCIATED MECHANICAL EVENT COUNTERS

BACKGROUND OF THE INVENTION

Field of the Invention

The invention relates to the field of mechanical counters and, more particularly, on the one hand, to a method for counting events occurring during a duration T adapted to be implemented by a mechanical event counter comprising at least two toothed wheels and, on the other hand, to associated mechanical counters.

Description of the Related Art

Patent DE19821467 discloses a counter comprising at least one first toothed wheel and one second toothed wheel meshing with each other and comprising a different number of teeth, and a method for counting the number of rotations performed by the first wheel between a time ti and a time tf from the difference in the number of teeth these wheels turned of between the time ti and the time tf.

In the field of MEMs, the patent application WO2012/143627 discloses a passive and reversible microsensor for counting events and, especially, the number of cycles of stresses to which a structure is submitted which can, for example, correspond to the number of cycles of temperature, mechanical stresses in tension, compression and/or flexion generated, for example, by the passage of mobile elements on this structure.

This microsensor comprises means for detecting and counting the cycles of variations in distance between two points or areas of a structure, these means comprising a support having first and second parts, each one having an anchoring area, these anchoring areas being adapted to be attached respectively to either one of the two points or areas of the structure, the counting means being associated with each one of said first and second parts of the support.

More precisely, as shown in FIG. 1a, this microsensor comprises a mainly U-shaped support 101, thus comprising a first part 102 and a second part 103 connected to each other by a third part 104 constituting the baseline of the U, and counting means 105 arranged on the support and comprising at least one first toothed wheel 106 disposed on said first part 102 of the support 101 and, on the one hand, a driving beam 107 of said first toothed wheel 106 attached at one end 108 of its ends 108,109 to said second part 103 and comprising, at its other end 109, a tooth adapted to constitute a gear 111 with the teeth of the first toothed wheel 106 and, on the other hand, a non-return device 113 of the first toothed wheel 106, such that when the first and second parts 102,103 of the support 101 are getting closer to each other, a drive of the toothed wheel 106 by the driving tooth of the driving beam 107 is generated while when both parts are moving away from each other, it causes the first toothed wheel 106 to be held by the non-return device 113 and a retraction of the tooth of the driving beam over a tooth of the first toothed wheel 106. The first and second parts comprise first and second anchoring areas, respectively 224 and 225, constituted by bores in which a screw can be inserted for attaching the microsensor on the structure to be analyzed such as, for example, the parapet of a bridge.

The first and second anchoring areas 224,225 are arranged respectively along a first axis Y1 and a second axis Y2 parallel to each other and separated by a distance L. Preferably, in order to minimize the sensor size, these anchoring areas are arranged such that the length L is as large as possible and such that the reversible deformation of the structure between the axes Y1 and Y2 is at least equal to the pitch P of the teeth of the counting wheel. Indeed, when the microsensor is attached to a structure submitted to a reversible deformation, the variation in distance between both anchoring areas 224 and 225, thus between the axes Y1 and Y2, is proportional to this length L. Therefore, for a given pitch P of the teeth of the counting wheel, and when using only one driving beam, the deformation of the structure between the axes Y1 and Y2 must be at least equal to P and preferably lower than or equal to 1.5·P in order to detect such an event.

In this type of microsensor, the axis of the counting wheel is arranged on the axis Y1 of the first part 102 and the driving beam 107 is integral with the second part 103.

In other words, the counting means comprise at least one toothed wheel and means for rotating this toothed wheel by an angle corresponding to the pitch of the teeth on this wheel every time an event occurs.

With a single wheel, with respect to an initial position of the wheel, it is possible to count a number of successive reversible deformations equal to the number of teeth Z1 of this wheel minus one because, beyond this, the number of deformations can be:

$$N = k \cdot Z1 + z1.$$

With:
N: number of reversible deformations,
k: number of revolutions performed by the wheel
Z1: number of teeth of the wheel
z1: position of the wheel with respect to its initial position corresponding to the number of teeth between the initial position and the final position.

As, with a single wheel, k cannot be determined, N cannot be determined either.

To partially overcome this disadvantage, this patent application discloses an embodiment shown in FIG. 1b in which the counting means comprise a first toothed wheel 54i having $Z_1 = 1000$ teeth and a second toothed wheel 150i having a single tooth and rotatably integral with the first wheel, said second wheel 150i being adapted, via its single tooth, to rotate a third toothed wheel 130i by an angle corresponding to the pitch of the teeth on said third wheel 130i every time the first wheel performs an entire revolution, said third toothed wheel 130i comprising $Z_2 = 20$ teeth.

Thus, it is possible to count unambiguously with respect to an initial position of said three wheels, a number of successive deformations equal to the product $Z_1 * Z_2 = 20,000$.

BRIEF SUMMARY OF THE INVENTION

However, one of the aims of MEMS is to be as compact as possible, thus less bulky. The invention is intended to provide a counter more compact than that of said FIG. 1b for counting the same number of events, or provide a counter with the same volume but allowing to count more events, typically from 10 to 1,000 times more.

The solution is a method for counting events occurring between a time ti and a time tf corresponding to a duration T, adapted to be implemented by a MEMS mechanical event counter comprising at least two toothed wheels, the pitch of the teeth being the same, a first toothed wheel $D_i$ comprising $Z_i$ teeth and a second toothed wheel $D_j$ having $Z_j$ teeth with $Z_i$ being different from $Z_j$ and the greatest common divisor (GCD) of $Z_i$ and $Z_j$ being different from $Z_i$ or $Z_j$ and preferably equal to 1, the occurrence of an event causing the rotation of each of these two wheels by an angle corresponding, at their periphery, to a chord equal to the pitch of their teeth and the initial position of the wheels with respect to an outer mark having been marked, the method being characterized in that it comprises:
  a first step consisting in counting or calculating or estimating, either for each of the wheels $D_1$, $D_2$, at the end of the duration T, the difference in the number of teeth $z_i$, respectively $z_j$, between its initial position at time ti and its final position at the end of the duration T, this difference being within the interval $[0,Z_i[$, respectively $[0,Z_j[$, or directly the difference $(z_i-z_j)$ between these differences, this step being at least partially carried out either by optical means requiring the presence on each of these toothed wheels of at least one mark adapted to allow to assign to each tooth of the wheel an order number with respect to this mark, or by means for measuring the angular displacement of each of these at least two toothed wheels between the time ti and the time tf and means for calculating $z_i$ and $z_j$, respectively for each wheel, from the measured value of its angular displacement between the times ti and tf and the number of its teeth, respectively $Z_i$ and $Z_j$,
  a second step consisting in calculating, preferably with the calculating means or calculating means, for example a computer, and if $z_i$ is different from $z_j$, the number of events which occurred N as a function of the difference between the values $z_i$ and $z_j$ and as a function of $Z_i$ and/or $Z_j$.

According to a particular feature which can be implemented when the number of events which occurred is lower than the value $Z_i*Z_j/GCD(Z_i,Z_j)$:
  the first step comprises a counting from the respective positioning of said marks, respectively at times ti and tf, or a computation from the measured values of angular displacement, respectively at times ti and tf, for at least one first wheel $D_i$ and one second wheel $D_j$ at the end of the duration T, of the difference in the number of teeth $z_i$, respectively $z_j$ between their initial position and their final position at the end of the duration T, this difference being within the interval $[0,Z_i[$ for the first one, respectively $[0,Z_j[$ for the second one,
  a second step consisting, for at least one integer value p between 0 and Pmax with:

$$P_{Max} = \frac{LCM(Z_i, i \in \{1, 2, \ldots, n\})}{Z_j} - \frac{LCM(Z_i, i \in \{1, 2, \ldots, n\})}{Z_i}$$

LCM being the least common multiple
  either in calculating the number of revolutions ki of the first wheel $D_i$ as a function of the difference $(Z_j-Z_i)$ between the values of the number of teeth of the first and second wheels $D_i,D_j$ and of the difference $(z_i-z_j)$ between the differences counted, for each wheel between its initial position and its final position, and then calculating the number of events which occurred during the duration T from the following formula:

$N=k_i \cdot Z_i+z_i$ or in calculating the number of events which occurred during the duration T from one of the following formulae:

$$N = \left(\frac{z_i - z_j - p \cdot Z_j}{Z_j - Z_i}\right) \cdot Z_i + z_i \text{ or } N = \left(\frac{z_i - z_j - p \cdot Z_j}{Z_j - Z_i}\right) \cdot Z_j + z_j$$

According to a particular feature, a method according to the invention comprises an intermediary step consisting in calculating, especially when $z_i$ is different from $z_j$, the number of revolutions $k_i,k_j$ performed by each of the wheels from the values $z_i$ and $z_j$ and the difference between the values $Z_i$ and $Z_j$.

According to a particular feature implemented by a mechanical counter having only two toothed wheels, a method according to the invention comprises a step for calculating the number of events occurred from one of the following formulae:

$N=[(z_2-z_1)/(Z_1-Z_2)]*Z_1+z_1$ $N=[(z_2-z_1)/(Z_1-Z_2)]*Z_2+z_2$

When the number of elements to be counted is higher than Zi*Zj/GCD(Zi,Zj), it is required to calculate the number of events which occurred with at least three toothed wheels by applying for example the following method:
  a first step consisting in counting, for each of the n toothed wheels $D_1$ to $D_n$, at the end of the duration T, the difference in the number of teeth zi between its initial position and its final position at the end of the duration T, this difference being within the interval $[0,Z_i-1]$,
  a second step consisting in calculating a value Pmax such as:

$$P_{Max} = \frac{LCM(Z_i, i \in \{1, 2, \ldots, n\})}{Z_2} - \frac{LCM(Z_i, i \in \{1, 2, \ldots, n\})}{Z_1}$$

a third step consisting, for p=0 to $P_{max}$:
  during a first phase, calculating the number of revolutions of the first toothed wheel D1 from the formula:

$$k_1 = \frac{z_1 - z_2 - p \cdot Z_2}{Z_2 - Z_1}$$

during a second phase, for i=2 to n:
    calculating $k_i$ from the following formula:

$$k_i = \frac{(k_1 + p) \cdot Z_2 + z_2 - z_i}{Z_i} \quad (5)$$

determining if the value ki is a possible value by meeting the following conditions:

$$\begin{cases} 0 \le k_i \le \frac{LCM(Z_i, i \in \{1, 2, \ldots, n\})}{Z_i} - 1 \\ E(k_i) - k_i = 0 \end{cases} \quad (6)$$

E(ki) being the floor part of $k_i$
  if the value ki is a possible value by meeting these conditions (6), then repeating the second phase for a new value "i" equal to i+1:
  if the value ki does not meet these conditions (6), then exiting the "i" loop and restarting the third step with a new value "p" equal to p+1 if all values ki are possible, exiting the "p" loop and calculating the number of stresses from the following formula:

$$N = k_1 \cdot Z_1 + z_1 = \left(\frac{z_1 - z_2 - p \cdot Z_2}{Z_2 - Z_1}\right) \cdot Z_1 + z_1$$

P being the value for which all the ki meet the conditions (6).

The invention also relates to mechanical counters configured to implement, at least partially, the first step of the method according to the invention.

According to a first feature of the invention, a mechanical event counter comprises:
- at least two toothed wheels, a first toothed wheel $D_i$ comprising $Z_i$ teeth evenly spaced with a pitch $p_i$ and adapted to rotate around a first axis and a second toothed wheel $D_j$ having $Z_j$ teeth evenly spaced with a pitch $p_j$, and adapted to rotate around a second axis, each of these toothed wheels comprising at least one radial mark adapted to allow to assign to each tooth of the wheel an order number with respect to this mark,
- means for rotating both toothed wheels by an angle equal to the pitches $p_i$ and $p_j$ of the teeth upon occurrence of an event to be counted,
- and it is characterized in that $p_i$ and $p_j$ are equal and the number of teeth $Z_i$ of the first toothed wheel $D_i$ is different from that $Z_j$ of the second toothed wheel $D_j$ and the GCD of $Z_i$ and $Z_j$ is different from $Z_i$ or $Z_j$ and preferably equal to 1.

According to a particular embodiment, a mechanical event counter according to the invention comprises optical means, for example a magnifying glass, a camera or a video camera and, when appropriate, means for processing signals delivered by the optical means for example constituted by a computer.

According to another particular embodiment, a mechanical event counter configured for implementing, at least partially, the first step of the method according to the invention comprises:
- at least two toothed wheels, a first toothed wheel $D_i$ comprising $Z_i$ teeth evenly spaced with a pitch $p_i$ and adapted to rotate around a first axis and a second toothed wheel $D_j$ having $Z_j$ teeth evenly spaced with a pitch $p_j$, and adapted to rotate around a second axis,
- means for rotating both toothed wheels by an angle equal to the pitches $p_i$ and $p_j$ of the teeth upon occurrence of an event to be counted,
- and it is characterized in that $p_i$ and $p_j$ are equal and the number of teeth $Z_i$ of the first toothed wheel $D_i$ is different from that $Z_j$ of the second toothed wheel $D_j$, and the GCD of $Z_i$ and $Z_j$ is different from $Z_i$ or $Z_j$ and preferably equal to 1, and in that it comprises means (598,599,709,710) for measuring the angular displacement of each of the at least two wheels.

According to an additional feature, the means for measuring the angular displacement of each wheel are of resistive, capacitive or magnetic type.

According to a particular feature, the rotating means drive the first toothed wheel $D_i$ by a first gear type link and the first toothed wheel drives the second toothed wheel by a second gear type link.

According to another feature, a counter according to the invention comprises:
- first means for rotating the first toothed wheel $D_i$, and first non-return means of this wheel,
- second means for rotating the second toothed wheel $D_j$, and second non-return means of this wheel.

According to an additional feature, the first and second axes of the toothed wheels $D_i$ and $D_j$ are collinear or coincident and, preferably, the at least two wheels are superimposed and arranged on the same side of the support.

According to another additional feature, one of the first and second toothed wheels $D_i$, $D_j$ comprises numerical or colored indications or any other means allowing to determine its angular position while the other comprises an opening on part of a sector, this opening making part of said numerical or colored indications visible.

These counters can be entirely passive, namely they do not require power to operate.

BRIEF DESCRIPTION OF THE DRAWINGS

Other advantages and features will become more apparent in the description of several embodiments of the invention, in reference to the appended drawings in which:

FIGS. 5a to 5e show exemplary embodiments of the toothed wheels which can be implemented in the context of FIG. 4, FIG. 6 shows a fifth exemplary embodiment of a mechanical counter allowing to implement a method according to the invention.

DETAILED DESCRIPTION OF THE PREFERRED EMBODIMENTS

Figure 2A:
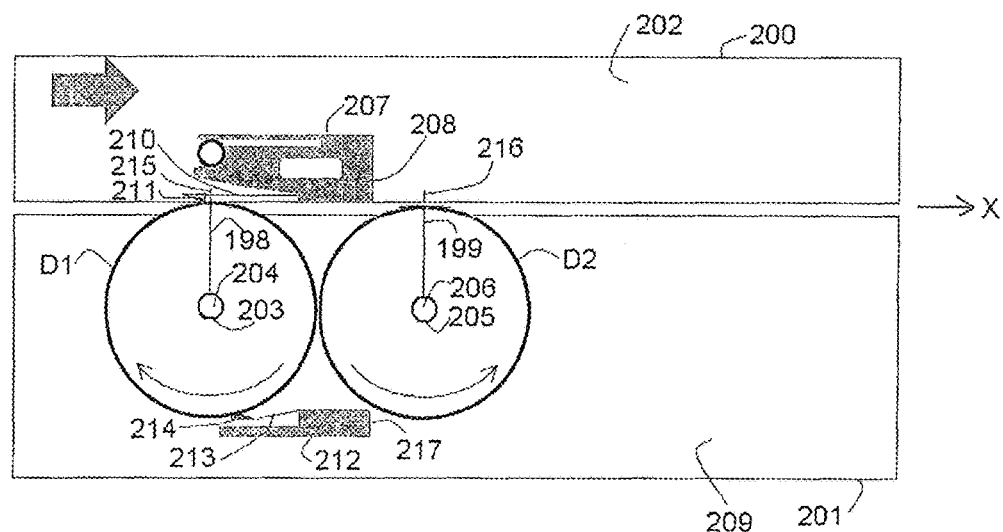
FIGS. 2a and 2b show a first exemplary embodiment of a mechanical counter allowing to implement a method according to the invention, respectively in an initial position and at the end of a duration T.
Figure 2B:
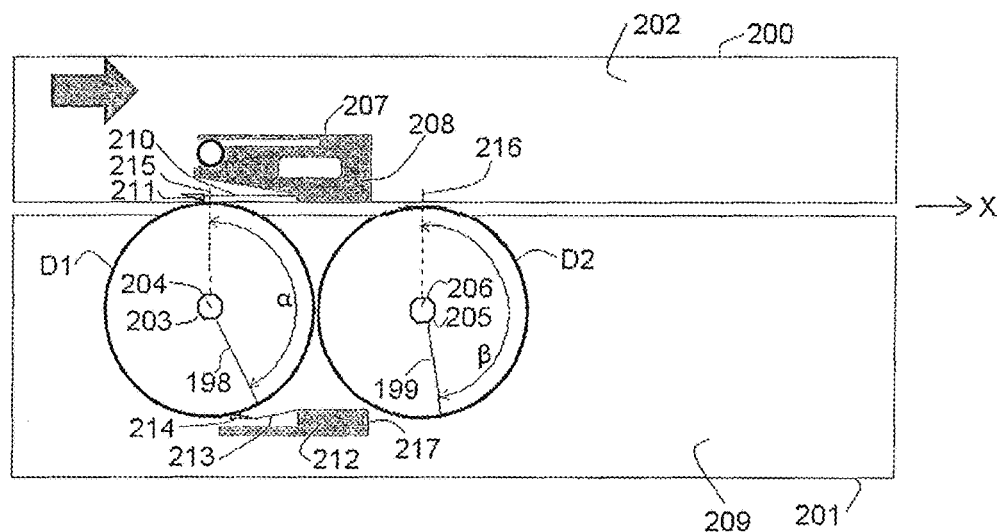

FIGS. 2a and 2b show a first exemplary embodiment of a device allowing to implement a method according to the invention, respectively in an initial position and at the end of a duration T.

This device has a first support 200 adapted to move cyclically along a longitudinal direction X with respect to a second supposedly stationary support 201, the first support returning to its initial position after each displacement. It also has means for counting the number of displacements during a determined duration T.

These counting means comprise:
- a first toothed wheel $D_1$ comprising $Z_1$=1,000 teeth and a first radial rectilinear mark 198 and being arranged parallel to one of the main faces 209 of the second support 201 and adapted to rotate, via an axial bore 203, around an axis 204 attached to the second support 201, a second toothed wheel $D_2$ comprising $Z_2$=999 teeth, and a second radial rectilinear mark 199 and being arranged parallel to the main face 209 of the second support 201 and adapted to rotate, via an axial bore 205, around an axis 206 attached to the second support 201, the first and second wheels being arranged so as to form a gear, the first wheel rotating the second wheel, means 207 for rotating the first toothed wheel $D_1$, these means comprising a base 208 attached to one of the main faces 202 of the first support 200 and on which is attached a driving beam 210 arranged longitudinally and comprising a tooth 211 at its free end, this tooth being disposed so as to form a gear with the first toothed wheel $D_1$, non-return means 217 of the first toothed wheel $D_1$ comprising a base 212 attached to the main face 202 of the second support facing the toothed wheel D, base on which is attached a beam 213 arranged longitudinally and comprising a tooth 214 at its free end, this tooth being disposed so as to form a gear with the first toothed wheel $D_1$.

Thus, when the first support 200 moves according to the direction X with respect to the second support 201, the tooth 211 of the rotating means rotates the first toothed wheel $D_1$ in the clockwise direction indicated by the arrow, this first toothed wheel $D_1$ in turn rotating the second toothed wheel in the anti-clockwise direction indicated by the arrow while the tooth 124 of the non-return means slides on the teeth of the first toothed wheel due to the tooth shape and the elasticity of the associated beam as explained for example by patent application WO 2012/143627 in reference to FIG. 5.

When the first support 200 returns to its initial position with respect to the second support 201, the tooth 214 of the non-return means blocks the first toothed wheel and prevents it from rotating in the anti-clockwise direction opposed to that indicated by the arrow while, due to the tooth shape and the elasticity of the associated beam, the tooth 211 of the rotating means slides on the teeth of the first toothed wheel as explained for example in patent application WO 2012/143627 in reference to FIG. 5.

In this exemplary embodiment, the first support 200 has third and fourth rectilinear marks 215,216 to allow an initial positioning of the toothed wheels in a known position. To this end, it is necessary, on the one hand, to align the first radial mark 198 of the first toothed wheel $D_1$ with the third rectilinear mark 215 and, on the other hand, to align the second radial mark 199 of the second toothed wheel $D_2$ with the fourth rectilinear mark 216.

FIG. 2a shows counting means in their initial position at time $t_i$ while FIG. 2b shows the same counting means in a second position at the end of a duration T, for example one year.

It can be noted, with respect to their respective initial positions, that the first toothed wheel rotated by an angle α corresponding to $z_1$=417 teeth while the second toothed wheel $D_2$ rotated by an angle β corresponding to $z_2$=454 teeth.

To calculate the number N of displacement cycle of the first support 200 with respect to the second support 201, there is only to apply a method according to the invention, namely:

counting, for each wheel $D_i$, $D_j$, at the end of the duration T, the difference in number of teeth $z_i$, respectively $z_j$, between its initial position and its final position at the end of the duration T, this difference being within the interval $[0, Z_i[$, respectively $[0, Z_j[$.

calculating the number of events which occurred N as a function of the difference between the values $z_1$ and $z_2$ and of $Z_1$ and/or $Z_2$, or their difference when $Z_2-Z_1>1$, for example from one of the following formulae:

$$N=[(z_2-z_1)/(Z_1-Z_2)]*Z_1+z_1 \quad (1)$$

$$N=[(z_2-z_1)/(Z_1-Z_2)]*Z_2+z_2 \quad (2)$$

As $Z1$=1,000 and $Z2$=999, $(Z_1-Z_2)$ is equal to 1, the formulae (1) and (2) are simplified into:

$$N=(z_2-z_1)*Z_1+z_1 \quad (3)$$

$$N=(z_2-z_1)*Z_2+z_2 \quad (4)$$

Therefore, according to (3), $$N=(454-417)*1000+417=37417 \text{ events.}$$

With two toothed wheels, the maximum number Nm of events which can be counted without any ambiguity, namely without returning to the initial position, is equal to:

$$Nm=\text{LCM}(Z_1, Z_2)-1$$

LCM being the least common multiple.

In this case, Nm=1000*999(−1)=998999.

Preferably, to maximize the number of events which can be counted, the numbers $Z_1$ and $Z_2$ are selected such that their greatest common divisor is equal to 1. The GCD must not be equal to $Z_1$ or $Z_2$ because, in this case, the toothed wheel comprising the least teeth would be unnecessary.

If the maximum number Nm of events to be counted without any ambiguity must be higher than 998,999, it is be necessary to add at least one third toothed wheel driven by the first or second wheel, this third toothed wheel comprising a number of teeth different from $Z_1$ and $Z_2$.

Practically, to determine the numbers $z_1$ and $z_2$ corresponding respectively to the number of teeth each wheel D1 and D2 turned of, with respect to their initial position, it is possible to implement optical means and, when appropriate, means for processing data issued by these optical means.

The simplest optical means can be a magnifying glass, namely in the case of use of the counter within a MEMS type device, the operator then counting the numbers z1 and z2.

The optical means can also, for example, be composed of those described in US patent application US 2002/0011840, but then require the presence of a power source. To avoid this, the optical means can consist in a camera preferably digital, or in a video camera producing an image of said wheels D1 and D2 and third and fourth rectilinear marks 215,216 and then zooming the image, or zooming so as to allow an operator to count the number of teeth arranged between the mark of the support and that of the corresponding wheel, thus the numbers z1 and z2.

The images obtained by a camera or a video camera can also be automatically processed by processing means, constituted for example by a computer and a computer program product. As an example, after zooming the image, the operator can enter the number of wheels implemented, two wheels in this embodiment and, for each one, their total number of teeth. Then, it is only necessary to delimit, by a first line, a first position corresponding to the mark provided on the support and corresponding to the positioning of the wheel at the beginning and, by a second line corresponding to the final position of the mark of the wheel, the processing means calculating the angle formed between these first and second lines and then the number of teeth corresponding to this angle, the latter number then being stored.

At the end of these computations for the two wheels, the processing means calculate and display, on the monitor, the number of events when occurred from the formulae 1) and 2).

An even more automatic method consists in implementing a software for processing an image by pattern recognition, or even color recognition, adapted to determine the position of the different marks 198, 199, 215 and 216 and then, from this information, and if required, from entry by an operator of the total number of teeth of each wheel, the processing means then calculate the angle formed between these first and second lines and then the number of teeth corresponding to this angle, the latter number being stored. At the end of these computations for the two wheels, the processing means calculate and display, on the monitor, the number of events which occurred from the formulae 1) and 2).

The reading of the angular difference between the two wheels can also be performed by measuring an electrical type physical value (resistance, capacity, magnetic variation, etc).

Thus, the determination of numbers $z_1$ and $z_2$ corresponding respectively to the number of teeth each wheel D1 and D2 turned of, with respect to their initial position, can be performed from the measurement of a variable resistance type electrical value according to the rotation angle of the wheels. This type of device is associated with a potentiometer and an embodiment thereof is given in reference to FIGS. 7a and 7b.

Figure 3A:
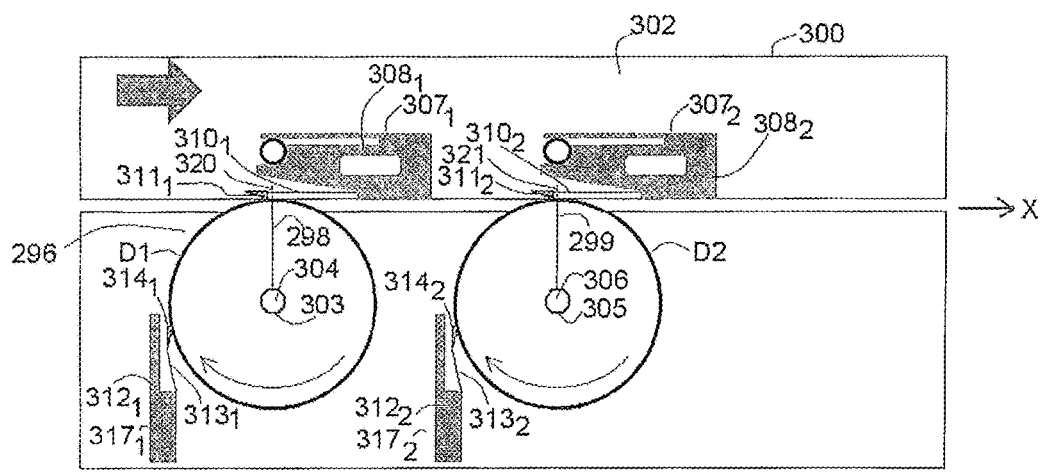
FIGS. 3a and 3b show a second exemplary embodiment of a mechanical counter allowing to implement a method according to the invention, respectively in an initial position and at the end of a duration T.
Figure 3B:
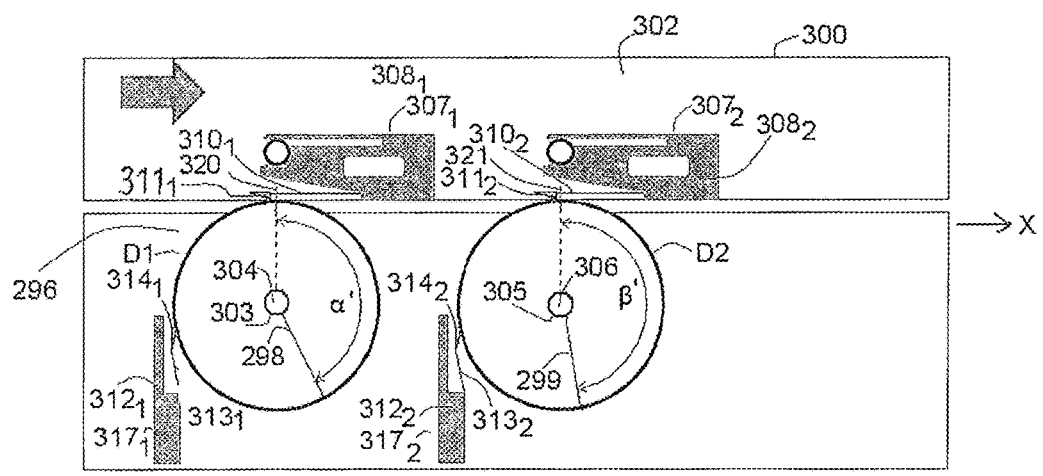

FIGS. 3a and 3b show a second exemplary embodiment of a device allowing to implement a method according to the invention, respectively in an initial position and at the end of a duration T.

This device has a first support 300 adapted to move cyclically along a longitudinal direction X with respect to a second supposedly stationary support 301, the first support returning to its initial position after each displacement. It also has first and second means for counting the number of displacements during a determined duration T.

The first counting means 296 comprise:
a first toothed wheel $D_1$ comprising Z1=1000 teeth and a first radial rectilinear mark 298 and being arranged parallel to one of the main faces 309 of the second support 301 and adapted to rotate, via an axial bore 303, around an axis 304 attached to the second support 301,
first means $307_1$ for rotating the first toothed wheel $D_1$, these means comprising a base $308_1$ attached to one of the main faces 302 of the first support 300 and on which is attached a driving beam $310_1$ arranged longitudinally and comprising a tooth $311_1$ at its free end, this tooth being disposed so as to form a gear with the first toothed wheel $D_1$,
first non-return means $317_1$ of the first toothed wheel $D_1$ comprising a base $312_1$ attached to the main face 309 of the second support facing the toothed wheel $D_1$, base on which is attached a beam $313_1$ transversal to the direction X and comprising a tooth $314_1$ at its free end, this tooth being disposed so as to form a gear with the first toothed wheel $D_1$.

The second counting means 297 comprise:
a second toothed wheel $D_2$ comprising $Z_2$=999 teeth, and a second radial rectilinear mark 299 and being arranged parallel to the main face 309 of the second support 301 and adapted to rotate, via an axial bore 305, around an axis 306 attached to the second support 301, the first and second wheels being disposed so as not to form a gear,
second means $307_2$ for rotating the second toothed wheel $D_2$, these means comprising a base $308_2$ attached to one of the main faces 302 of the first support 300 and on which is attached a driving beam $310_2$ arranged longitudinally and comprising a tooth $311_2$ at its free end, this tooth being disposed so as to form a gear with the second toothed wheel $D_2$. These second rotating means $307_2$ being identical to the first rotating means and being submitted to the same displacement as the first support. Therefore, the first and second counting means count the same events.
second non-return means $317_2$ of the second toothed wheel $D_2$ comprising a base $312_2$ attached to the main face 309 of the second support facing the toothed wheel $D_2$, base on which is attached a beam $313_2$ transversal to the direction X and comprising a tooth $314_2$ at its free end, this tooth being disposed so as to form a gear with the second toothed wheel $D_2$.

Thus, when the first support 300 moves according to the direction X with respect to the second support 301, on the one hand, the tooth $311_1$ of the first rotating means 296 rotates the first toothed wheel $D_1$ in the clockwise direction indicated by the arrow, while the tooth $314_1$ of the non-return means $317_2$ slides on the teeth of the first toothed wheel due to the tooth shape and the elasticity of the associated beam and, on the other hand, the tooth $311_2$ of the second rotating means 297 simultaneously rotates the second toothed wheel $D_2$ in the clockwise direction indicated by the arrow while the tooth $314_2$ of the non-return means $317_2$ slides on the teeth of the first toothed wheel due to the tooth shape and the elasticity of the associated beam.

When the first support 300 returns to its initial position with respect to the second support 301, the tooth $314_1$ of the first non-return means $317_1$ blocks the first toothed wheel and prevents it from rotating in the anti-clockwise direction opposed to that indicated by the arrow while, due to its tooth shape and the elasticity of the associated beam, the tooth $311_1$ of the first rotating means 296 slides on those of the first toothed wheel $D_1$. Similarly, the tooth $314_2$ of the second non-return means $317_2$ blocks the second toothed wheel $D_2$ and prevents it from rotating in the anti-clockwise direction opposed to that indicated by the arrow while, due to its shape and the elasticity of the associated beam, the tooth $311_2$ of the second rotating means 297 slides on those of the second toothed wheel $D_2$.

In this exemplary embodiment, the first support 300 has third and fourth rectilinear marks 320,321 to allow an initial positioning of the toothed wheels $D_1$ and $D_2$ in a known position. To this end, it is only necessary, on the one hand, to align the first radial mark 298 of the first toothed wheel $D_1$ with the third rectilinear mark 320 and, on the other hand, to align the second radial mark 199 of the second toothed wheel $D_2$ with the fourth rectilinear mark 321.

FIG. 3a shows the counting means in their initial position at time $t_i$ while FIG. 3b shows the same counting means in a second position at the end of a duration T, for example one year.

It can be noted, with respect to their respective initial positions, that the first toothed wheel rotated by an angle α' corresponding to $z_1$=420 teeth while the second toothed wheel $D_2$ rotated by an angle β' corresponding to $z_2$=450 teeth.

By applying the method according to the invention described above, the number of events counted can be deduced, namely:

$$N=(450-420)*1000+420=30420 \text{ events}.$$

Figure 3C:
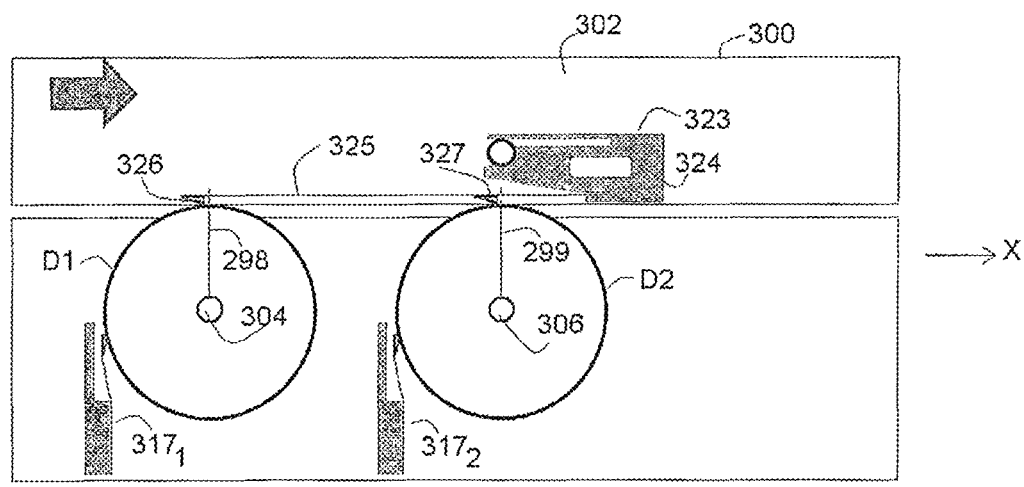
FIG. 3c shows a third exemplary embodiment of a mechanical counter allowing to implement a method according to the invention.

The third exemplary embodiment of FIG. 3c differs from that of FIG. 3a in that the first and second rotating means are replaced with third rotating means 323 comprising a base 324 attached to one of the main faces 302 of the first support 300 and on which is attached a driving beam 325 arranged longitudinally and comprising, on the one hand, a first tooth 326 at its free end, this tooth being disposed so as to form a gear with the first toothed wheel $D_1$ and, on the other hand, a second tooth 327 disposed so as to form a gear with the second toothed wheel $D_2$.

In operation, any displacement of the first support 300 with respect to the second support 301 according to the direction X generates the same displacement on the third rotating means which rotate the first and second toothed wheels $D_1$ and $D_2$ in the clockwise direction producing an increase in the number of events counted as long as this displacement is higher or equal to the pitch of the teeth on the wheels $D_1$ and $D_2$.

Figure 4:
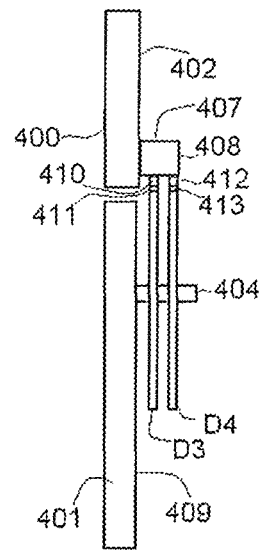
FIG. 4 shows a fourth exemplary embodiment of a mechanical counter allowing to implement a method according to the invention.

FIG. 4 shows a fourth exemplary embodiment of a device allowing to implement a method according to the invention.

This device has a first support 400 adapted to move cyclically along a longitudinal direction X with respect to a second supposedly stationary support 401, the first support 400 returning to its initial position after each displacement. It also has means for counting the number of displacement during a determined duration T.

These counting means comprise:
- a third toothed wheel $D_3$ comprising Z3=999 teeth and a first radial rectilinear mark and being arranged parallel to one of the main faces 409 of the second support 401 and adapted to rotate, via an axial bore, around an axis 404 attached to the second support 401,
- a fourth toothed wheel $D_4$ comprising $Z_4$=997 teeth, and a second radial rectilinear mark and being arranged parallel to the third toothed wheel $D_3$ and adapted to rotate, via an axial bore, around said axis 404,
- means 407 for rotating the third and fourth toothed wheels D3,D4, these means comprising a base 408 attached to one of the main faces 402 of the first support 400 and on which is attached, on the one hand, a first driving beam 410 arranged longitudinally and comprising a tooth 411 at its free end, this tooth being disposed so as to form a gear with the third toothed wheel $D_3$ and, on the other hand, a second driving beam 412 arranged longitudinally and comprising a tooth 413 at its free end, this tooth being disposed so as to form a gear with the fourth toothed wheel $D_4$.

In operation, any displacement of the first support 400 with respect to the second support 401 according to the direction X generates the same displacement on the rotating means 407 which rotate the third and fourth toothed wheels $D_3$ and $D_4$ in the clockwise direction producing an increase in the number of events counted as long as this displacement is higher or equal to the pitch of the teeth on the wheels D3 and D4.

With a configuration according to FIG. 4, it is possible, in some cases, to significantly simplify the first and second steps of the method according to the invention.

The equations (1) and (2), namely:

$$N=[(z_2-z_1)/(Z_1-Z_2)]*Z_1+z_1 \quad (1)$$

$$N=[(z_2-z_1)/(Z_1-Z_2)]*Z_2+z_2 \quad (2)$$

show that, to calculate N, it is necessary to know, in addition to the number of teeth $Z_1$ and $Z_2$ of each wheel, the difference $(z_2-z_1)$ and $z_1$ or $z_2$.

In addition, it can be noted that the more the difference $(z_2-z_1)$ increases, the more insignificant the value $z_1$ or $z_2$ is with respect to the products $[(z_2-z1)/(Z_1-Z_2)]*Z_1$ or $[(z_2-z_1)/(Z_1-Z_2)]*Z_2$.

As an example, the maximum influence of $z_2$, considered in this case equal to $Z_2-1$, on the computation of Nmax from the equation (2) is indicated, for different values of $(z_2-z_1)$, in the Table 1 for a first case where Z1=1000 and Z2=999, in the Table 2 for a second case where Z1=100 and Z2=99 and in the Table 3 for a third case where Z1=10 and Z2=9.

TABLE 1

| z2-z1 | Nmax | z2/N |
|---|---|---|
| 1 | 1997 | 50.0% |
| 9 | 9989 | 10.0% |
| 99 | 99899 | 1.0% |
| 999 | 998999 | 0.1% |

TABLE 2

| z2-z1 | Nmax | z2/Nmax |
|---|---|---|
| 1 | 197 | 50.0% |
| 9 | 989 | 9.1% |
| 99 | 9899 | 1.0% |

TABLE 3

| z2-z1 | Nmax | z2/Nmax |
|---|---|---|
| 1 | 17 | 50.0% |
| 9 | 89 | 9.1% |

It can be noted, for example, that, in the first and second cases, a maximum error of 1% for calculating N is generated if the term $z_2$ is neglected in relation to the product $[(z_2-z_1)/(Z_1-Z_2)]*Z_2$ when the number of events counted is respectively higher than 99899 and 9899.

In these examples, every time the wheel D1 performs one revolution, the wheel D2 performs one revolution plus an angle corresponding to that of a tooth. Consequently, between the times ti and tf corresponding to a duration T, the difference between the two wheels will correspond directly and physically to the difference $z_2-z_1$ and indirectly to the number of events which occurred.

Also, in the configuration of FIG. 4, it is possible to determine directly the difference $(z_2-z_1)$ and, optionally, the product $[(z_2-z_1)/(Z_1-Z_2)]*Z_1$ or the product $[(z_2-z_1)/(Z_1-Z_2)]*Z_2$.

FIGS. 5a to 5e show exemplary embodiments of the toothed wheels which can be implemented in the configuration of FIG. 4 and allowing to determine directly the difference $(z_2-z_1)$ and, optionally, the product $[(z_2-z_1)/(Z_1-Z_2)]*Z_1$ or the product $[(z_2-z_1)/(Z_1-Z_2)]*Z_2$. FIG. 5a shows an embodiment of a sixth toothed wheel $D_6$ comprising 999 teeth. The latter has an opening 455 on part of a sector corresponding for example to about 10% of its periphery as well as, within the median part of the sector 455, protruding parts 456,457 of the wheel with a equilateral triangle shape and mutually facing and intended to serve as a reading mark and as an initial positioning mark. FIGS. 5b and 5c show a first exemplary embodiment of the fifth toothed wheel $D_5$ comprising 1000 teeth, respectively alone and in association with the sixth toothed wheel $D_6$.

In the exemplary embodiment of FIG. 5b, the fifth toothed wheel $D_5$ comprises radial marks constituted by numerical indications 450 evenly distributed, for example every 5% of the total capacity of 998999 events corresponding to an offset of 999 teeth between the two wheels, this from 0% to 95%. Obviously, the indications can directly correspond to one of the products $[(z_2-z_1)/(Z_1-Z_2)]*Z_1$ or $[(z_2-z_1)/(Z_1-Z_2)]*Z_2$. At time ti, the mark "0" of the fifth wheel is facing the mark constituted by the protruding parts 456,457 of the sixth wheel.

To simplify at most the implementation of these wheels, in operation, the sixth toothed wheel $D_6$ which has one tooth less than the fifth wheel will rotate slightly faster than the latter, this speed difference generating an offset of the wheels at each revolution of the fifth wheel, this offset causing a corresponding offset of the numerical indications with respect to the mark constituted by the radius of the sixth wheel $D_6$ passing through the protruding parts 456 and 457.

In FIG. 5c, the radius of the toothed wheel passing through the tips of said protruding parts 456,457 is comprised between the numerical indications 15 and 20% and, more specifically, by interpolation, is equal to the value of about 18%. This means than the number of events counted is approximately equal to the product:

$N=18\%*Nm=18\%*(1000*999-1)=179819$ events.

In the embodiment of FIG. 5d, the fifth toothed wheel $D_5$ has radial marks constituted by colored indicators and by a mark "0" to be positioned at time ti in front of the mark constituted by the protruding parts 456,457 of the sixth wheel. The reading is thus performed using three colored sectors allowing to know the position of the system with respect to the total storage capacity:

- a first sector 451 with a green color for positions for example between 0% and 80% of the total capacity and corresponding to 80% of the periphery of the wheel,
- a second sector 452 with an orange color for positions for example between 80% and 90% of the total capacity and corresponding to 10% of the periphery of the wheel,
- a third sector 453 with a red color for positions for example between 90% and 100% of the total capacity and corresponding to 10% of the periphery of the wheel.

In operation, the sixth toothed wheel $D_6$ which has two teeth less than the third wheel will rotate slightly faster than the latter, this speed difference generating an offset of the wheels at each revolution of the third wheel, this offset causing a corresponding offset of the colored sectors with respect to the mark constituted by the radius of the sixth wheel passing through the protruding parts 456 and 457.

Up to 80% of the maximum counting capacity without any ambiguity, the radius of the fourth toothed wheel passing through the tips of said protruding parts 456,457 is within the first green sector 451 and it is not possible to determine the number of events which occurred directly from the colors if at least the transition 459 between the green sector 451 and the orange sector 452 does not appear within the opening 455.

From 80% to 90% of the maximum counting capacity without any ambiguity, the radius of the sixth toothed wheel passing through the tips of said protruding parts 456,457 is within the second orange sector.

From 90% to 100% of the maximum counting capacity without any ambiguity, the radius of the sixth toothed wheel passing through the tips of said protruding parts 456,457 is within the third red sector 453.

When the red sector appears within the opening, it is possible to:

- either calculate approximately the number of events counted, namely about 88%*Nm in FIG. 5e, the transition 454 between the second and third sectors 452, 453 allowing to determine this percentage with a good accuracy,
- or for an exact total count, determine for each wheel the number of teeth $z_1,z_2$ it turned of with respect to their initial position, and then apply the method according to the invention as described, for example, in reference to FIGS. 2a and 2b, knowing that, in this case, the difference $(Z_1-Z_2)$ is equal to 1.

Then, the wheels can be positioned again in their initial position, namely the numerical indication 0% or the limit 458 between the first green sector and the third red sector is positioned on the radius of the sixth toothed wheel passing through the tips of said protruding parts 456,457, this radius being also matched with a mark present on the first support 400.

Practically, to determine the difference $(z_1-z_2)$, it is possible to implement optical means and, when appropriate, means for processing the data issued by these optical means, such as a calculator.

The simplest optical means can be a magnifying glass, the operator having either directly a numerical indication in percentage of the total number of events which can be counted without any ambiguity, or even of the number of events which occurred, in front of the mark constituted by the protruding parts 456,457, then counting the numbers z1 and z2, or a colored indication allowing to indicate for example the occurrence of a threshold or just estimate the difference $(z_2-z_1)$ or the number of events.

Obviously, when the fifth wheel has numerical indications of number of events, the use of the magnifying glass to read said indications automatically implements the first and second steps of the method. When the fifth wheel has an indication in percentage or in value of $z_2-z_1$, it is then necessary to further proceed to the second step of the method according to the invention.

In addition, optical means other than a magnifying glass such as, for example, those described in FIGS. 2a and 2b can be implemented.

FIG. 6 shows a fifth exemplary embodiment of a device allowing to implement a method according to the invention.

This device has a first support 500 adapted to move cyclically along a longitudinal direction X with respect to a second supposedly stationary support 501, the first support returning to its initial position after each displacement. It also has means for counting the number of displacement during a determined duration T.

These counting means comprise n toothed wheels $D_1$ to $D_n$ as well as n rotating means $E_1$ to $E_n$ and n non-return means associated similar to those shown in FIG. 3a. The n toothed wheels $D_1$ to $D_n$ have respectively Zi teeth with, for maximizing the total counting capacity, each toothed wheel having a number of teeth different from that of all the others and the pitch of the teeth being the same for all toothed wheels. In addition, the second support comprises means 502 adapted to limit the displacement of the rotating means to a value substantially equal to 1.5 times the pitch of the teeth of the toothed wheels as explained in the patent application WO 2012/143627 in reference to FIG. 4c.

In operation, any displacement of the first support 500 with respect to the second support 501 along the direction X generates the same displacement on the n rotating means $E_1$ to $E_n$, sometimes less if the latter abut against the means 502 for limiting their displacement, these n rotating means $E_1$ to $E_n$ rotating, respectively, the n toothed wheels $D_1$ to $D_n$ in the clockwise direction producing an increase in the number of events counted as long as this displacement is higher or equal to the pitch of the teeth of the wheels and the non-return means AR hold the wheels when the first support returns to its initial position with respect to the second support.

A method for determining, from a known initial position of the different wheels, the number of events counted during a duration T can be as follows:
- a first step consisting in counting, for at least one first wheel Di and one second wheel Dj at the end of the duration T, the difference in the number of teeth zi, respectively zj between their initial position and their final position at the end of the duration T, this difference being between 0 and $(Z_i-1)$ for the first wheel and 0 and $(Z_j-1)$ for the second wheel,
- a second step consisting, for at least one integer p between 0 and $P_{max}$ with:

$$P_{Max} = \frac{LCM(Z_i, i \in \{1, 2, \dots, n\})}{Z_2} - \frac{LCM(Z_i, i \in \{1, 2, \dots, n\})}{Z_1}$$

in either calculating the number of revolutions ki of the first wheel Di according to the difference $(Z_j-Z_i)$ between the values of the number of teeth of the first and second wheels $D_i, D_j$ and to the difference $(z_i-z_j)$ between the differences counted, for each wheel between its initial position and its final position, and then calculating the number of events which occurred during the duration T from the following formula:

$$N = k_i \cdot Z_i + z_i$$

or in calculating the number of events which occurred during the duration T from one of the following formulae:

$$N = \left(\frac{z_i - z_j - p \cdot Z_j}{Z_j - Z_i}\right) \cdot Z_i + z_i$$

When the number of elements to be counted is higher than $Z_i \cdot Z_j / GCD(Z_i, Z_j)$, it is necessary to calculate the number of events which occurred with at least three toothed wheels by applying for example the following method:
- a first step consisting in counting, for each of n toothed wheels $D_1$ to $D_n$, at the end of the duration T, the difference in the number of teeth zi between its initial position and its final position at the end of the duration T, this difference being within the interval $[0, Z_i-1]$,
- a second step consisting in calculating a value Pmax such as:

$$P_{Max} = \frac{LCM(Z_i, i \in \{1, 2, \dots, n\})}{Z_2} - \frac{LCM(Z_i, i \in \{1, 2, \dots, n\})}{Z_1}$$

- a third step consisting
  during a first phase, calculating the number of revolutions the first toothed wheel D1 turned of from the formula:

$$k_1 = \frac{z_1 - z_2 - p \cdot Z_2}{Z_2 - Z_1}$$

during a second phase, for i=2 to n:
calculating ki from the following formula:

$$k_i = \frac{(k_1 + p) \cdot Z_2 + z_2 - z_i}{Z_i} \quad (5)$$

determining if the value ki is a possible value by meeting the following conditions:

$$\begin{cases} 0 \leq k_i \leq \frac{LCM(Z_i, i \in \{1, 2, \dots, n\})}{Z_i} - 1 \\ E(k_i) - k_i = 0 \end{cases} \quad (6)$$

if the value ki is a possible value by meeting these conditions (6), then repeating the second phase for a new value "i" equal to i+1:
if the value ki does not meet these conditions (6), then exiting the "i" loop, new value of "p" equal to p+1,
if all values ki are possible: exiting the "p" loop and calculating the number of stresses from the following formula:

$$N = k_1 \cdot Z_1 + z_1 = \left(\frac{z_1 - z_2 - p \cdot Z_2}{Z_2 - Z_1}\right) \cdot Z_1 + z_1$$

P being the value for which all the ki meet the conditions (6).

In each exemplary embodiment, in the case where the number of events to be counted is lower than the number of teeth of one of the toothed wheels, the determination of this number of events can be determined directly by counting the difference in the number of teeth zi between the initial position and the final position of this wheel at the end of the duration T, this difference being within the interval $[0, Z_i-1]$.

Figure 7A:
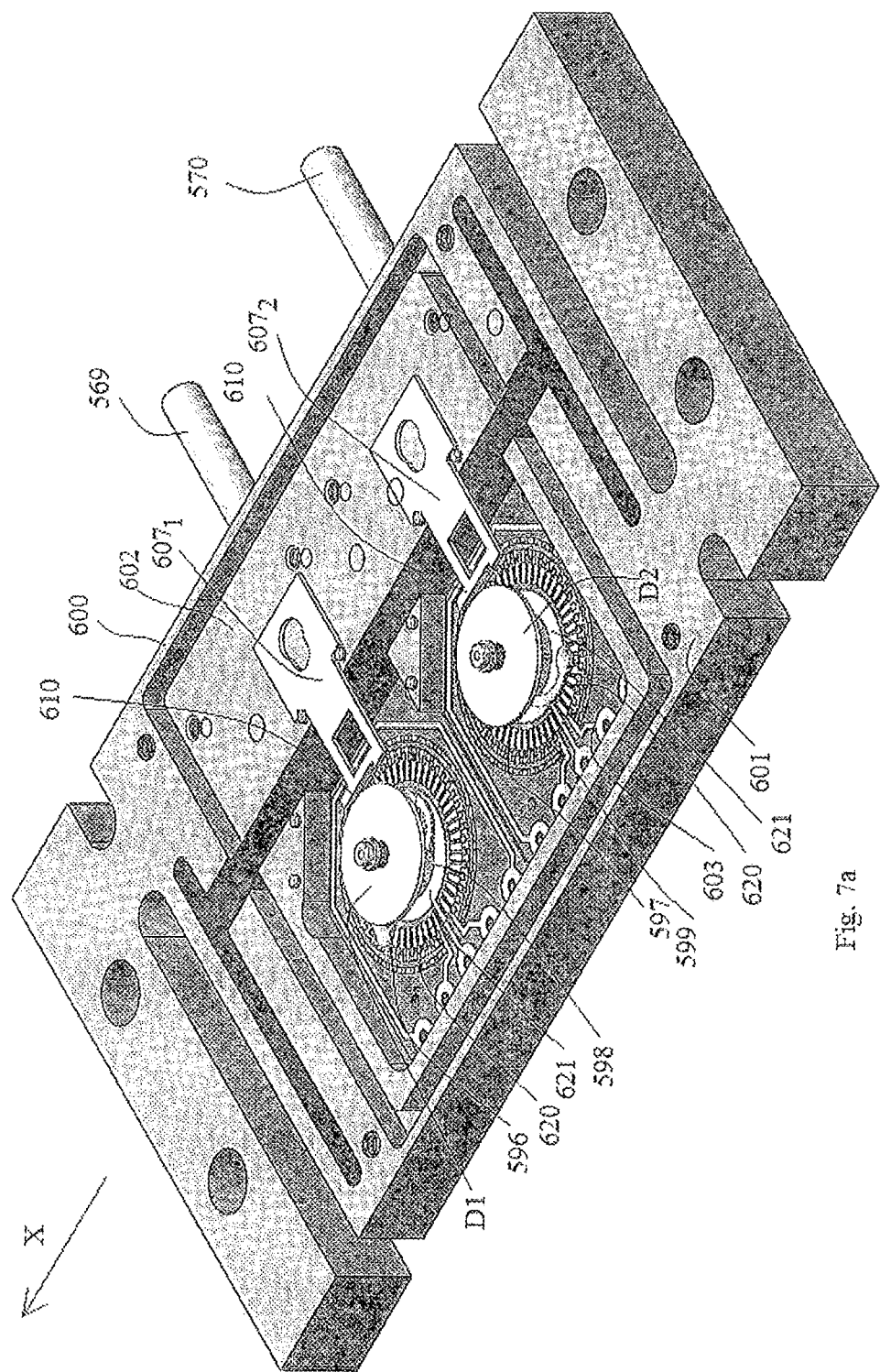
FIGS. 7a and 7b show a sixth exemplary embodiment of a MEMS device allowing to implement a method according to the invention with resistive-type angular measuring means.
Figure 7B:
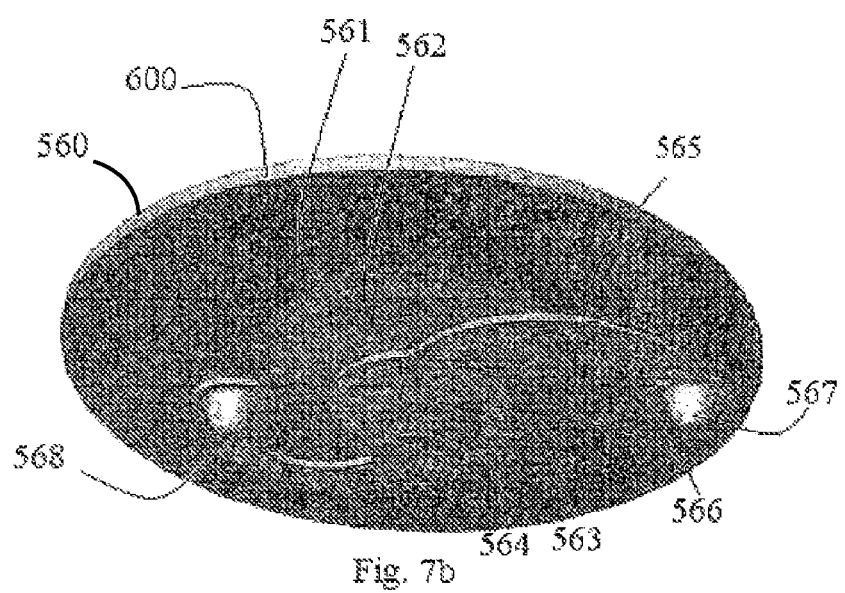

FIGS. 7a and 7b show a sixth exemplary embodiment of a MEMS device allowing to implement a method according to the invention with resistive-type angular measuring means. This device has a first support 600 adapted to move cyclically along a longitudinal direction X with respect to a second supposedly stationary support 601, the first support returning to its initial position after each displacement. It also has first and second means for counting the number of displacement during a determined duration T.

The first counting means 596 comprise:
- a first toothed wheel $D_1$ comprising $Z_1$=1000 teeth, on which is attached an axial one-piece hub 560 constituted by four coaxial cylinders 561, 562, 563 and 564, the latter being adapted to be embedded within a cylindrical bore arranged within the second support 601 and such that the plane of the toothed wheel is parallel to that of the second support,
- first means $607_1$ for rotating the first toothed wheel $D_1$, these means comprising a base attached to one of the main faces 602 of the first support 600 and on which is attached a driving beam 610 arranged longitudinally and comprising a tooth at its free end, this tooth being disposed so as to form a gear with the first toothed wheel $D_1$, first non-return means not shown in FIG. 7a for clarity purposes of the figure, these means being similar to those of FIG. 3a.

The second counting means 597 comprise:

a second toothed wheel $D_2$ comprising $Z_2$=999 teeth, and on which is attached an axial one-piece hub 560 constituted by four coaxial cylinders 561,562,563 and 564, the latter being adapted to be embedded within a cylindrical bore arranged within the second support 601 and such that the plane of the toothed wheel is parallel to that of the second support, second means $607_2$ for rotating the first toothed wheel $D_1$, these means comprising a base attached to one of the main faces 603 of the first support 600 and on which is attached a driving beam 610 arranged longitudinally and comprising a tooth at its free end, this tooth being arranged so as to form a gear with the first toothed wheel $D_1$.

Thus, when the first support 600 moves along the direction X with respect to the second support 601, on the one hand, the tooth of the first rotating means 596 rotate the first toothed wheel $D_1$ in the clockwise direction indicated by the arrow while the tooth of the non-return means slides on the teeth of the first toothed wheel due to the tooth shape and the elasticity of the associated beam and, on the other hand, the tooth of the second rotating means 597 rotate, simultaneously, the second toothed wheel $D_2$ in the clockwise direction indicated by the arrow while the tooth of the non-return means slides on the teeth of the first toothed wheel due to the tooth shape and the elasticity of the associated beam.

Each of the counting means 596,597 further comprises means 598,599 for measuring the angular displacement of said wheels.

These means for measuring the angular displacement of said wheels comprise, associated with each wheel:

- a non-symmetrical S-shaped slider 565 comprising a central ring 566 integral with the hub 560 along a plane substantially parallel to that of the wheel, the central ring 566 abutting against the second and third coaxial cylinders 562 and 563, this slider 565 comprising a first micro-contactor 567 at its first end and a second micro-contactor 568 at its second end, these micro-contactors being at different diameters with respect to the axis 619 of the hub 560.
- a first continuous resistive annular outer track 620 (as in patent EP546907) arranged on the support 601, with an axis on the axis of the hub 560 and the average diameter of which is such that it contacts the first contactor 567.
- a second continuous conducting annular inner track 621 with a diameter smaller than that of the resistive annular track which is arranged on the support 601, with an axis on the axis of the hub 560 and the average diameter of which is such that it contacts the second contactor 568.
- three electrical access points to apply reference voltages, which are evenly distributed on the resistive track 1 and the conducting track 2 constitutes an access point to the slider 565, for the reading of measurements. The different access points are connected to a socket 569 for the first counting means 596 and 570 for the second counting means 597. Preferably, the three points A, B, C are equidistant.

Figure 1A:
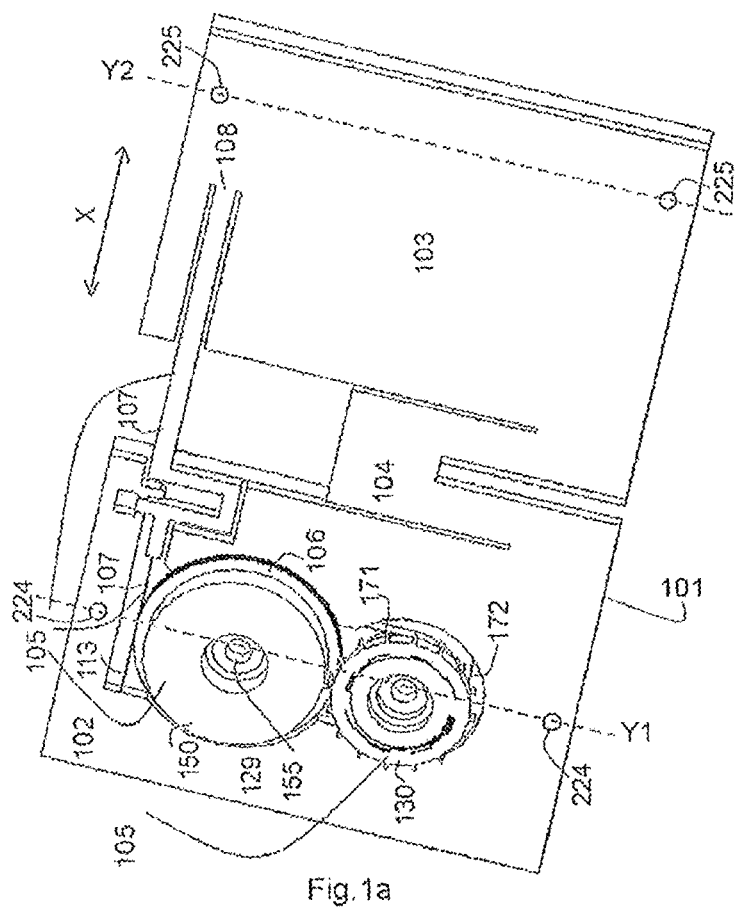
FIGS. 1a and 1b show embodiments of a prior art microsensor disclosed in the patent application WO 2012/143627.
Figure 1B:
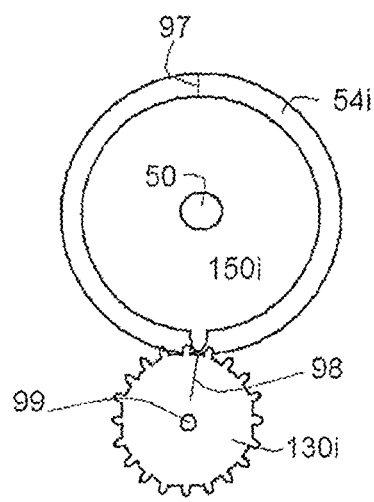

Thus, the configuration complies with that shown in FIG. 1 of patent EP546907 and the associated method for calculating the angular displacement of the wheel can also be implemented in reference to FIG. 7a. It is thus possible to determine the rotation angle of the wheels between two successive measurements. From the knowledge of this displacement angle between two successive measurements, for example at times ti and tf corresponding to a duration T, and the number of teeth of each toothed wheel, it is possible to calculate, optionally by calculating means, the numbers $z_1$ and $z_2$ corresponding respectively to the number of teeth rotated by each of the wheels D1 and D2 turned of with respect to their initial position, and then the corresponding number of events which occurred from the formulae 1) and 2).

Figure 8:
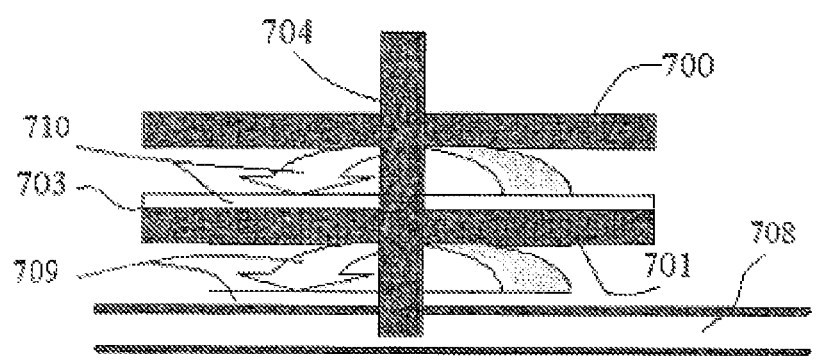
FIG. 8 shows a seventh exemplary embodiment of a MEMS device allowing to implement a method according to the invention with resistive-type angular measuring means.

FIG. 8 shows a seventh exemplary embodiment of a MEMS device allowing to implement a method according to the invention with resistive-type angular measuring means.

In this exemplary embodiment, the two toothed wheels 701,702 are disposed according to FIG. 4 on a same axis 704, these wheels being superimposed, a lower wheel 702 and an upper wheel 701 with respect to the support 708. The counting means comprise first means 709 for measuring the angular displacement of the lower wheel 702 and second means 710 for measuring the angular difference between the angular position of the upper wheel and that of the lower wheel. The first means 709 are similar to those described in reference to FIGS. 7a and 7b. The second means 710 comprise, on the one hand, a slider according to FIG. 7b integral with the upper toothed wheel 701 and interposed between the two toothed wheels 701,702 and, on the other hand, a resistive annular track and a conducting annular track with a smaller diameter arranged on the upper face 703 of the second toothed wheel 702 and such that the first micro-contactor of the slider contacts the resistive track and the second micro-contactor of the slider contacts the conducting track. The different contact points are connected to an outer socket by sliding contacts.

Thus, from the knowledge of the displacement angle α of the lower wheel 702 measured by the second means 710 between times ti and tf corresponding to a duration T and the number of teeth of these toothed wheels, it is possible to calculate, optionally by calculating means, the number $z_2$ corresponding to the number of teeth this wheel 702 turned of, with respect to its initial position at time ti.

Then, from the value α and the variation β of angular difference between the wheels 701 and 702 measured by the first means 709 between times ti and tf, it is possible to simply calculate, optionally with calculating means, the displacement angle δ of the upper wheel 701 and, from δ and the value of the number of teeth of the upper wheel 701, it is possible to calculate $z_1$. Then, it is just necessary to calculate the number of events which occurred from one or more of the formulae 1) and 2).

Obviously, many changes can be made to the exemplary embodiments described without departing from the scope of the invention. Thus, the mark allowing to assign to each tooth of the wheel an order number with respect to this mark can be constituted not only by a radial line but also, for example, by a non-radial line, a point, a geometrical figure, an engraving, a slot, an excess material or the addition of an additional element with a size smaller than that of the wheel.

Furthermore, the non-return means can also be constituted by means for braking the toothed wheel such as, for example, a pad adapted to friction the wheel.

In reference to FIG. 5, the wheels can be rotated by respective rotating means or an intermediary wheel can be used, a first wheel being rotated by rotating means and in turn rotating the intermediary wheel which in turn rotates the second wheel.

The invention claimed is:

1. A method for counting events occurring between a time ti and a time tf corresponding to a duration T adapted to be implemented by a MEMS mechanical event counter including at least two toothed wheels, the pitch of the teeth of at least two toothed wheels being the same, a first toothed wheel $D_i$ including $Z_i$ teeth and a second toothed wheel $D_j$ having $Z_j$ teeth with $Z_i$ being different from $Z_j$ and the greatest common divisor of $Z_i$ and $Z_j$ being different from $Z_i$ or $Z_j$, the occurrence of an event causing the rotation of each of the at least two wheels by an angle corresponding, at the periphery of the at least two wheels, to a chord equal to the pitch of the teeth of the at least two wheels and the initial position of the at least two wheels with respect to an outer mark made on the at least two wheels, the method comprising:

a first step consisting in one of counting, calculating, and estimating, either for each wheel, at the end of the duration T, the difference in the number of teeth $z_i$, respectively $z_j$, between its initial position at time ti and its final position at the end of the duration T, the difference being within the interval $[0,Z_i[$, respectively $[0,Z_j[$, or directly the difference $(z_1-z_j)$ between the differences, the first step being at least partially carried out by one of an optical system requiring the presence on each toothed wheel of at least one mark configured to allow to assign to each tooth of the wheel an order number with respect to the mark, and of a measurement system configured to measure the angular displacement of each of the at least two toothed wheels between the time ti and the time tf and a calculator configured to calculate $z_i$ and $z_j$, respectively, for each of the at least two wheels, from the measured value of the angular displacement of the at least two wheels between the times ti and tf and the number of teeth of the at least two wheels, respectively $Z_i$ and $Z_j$; and a second step consisting in calculating, with the calculator, and when $z_i$ is different from $z_j$, the number of events which occurred N as a function of the difference between the values $z_i$ and $z_j$ and as a function of at least one of $Z_i$ and $Z_j$.

2. The method according to claim 1, wherein:

the first step has a counting from the respective positioning of said marks, respectively at times ti and tf, or a computation from the measured values of angular displacement, respectively at times ti and tf, for at least one first wheel $D_i$ and one second wheel $D_j$ at the end of the duration T, the difference in the number of teeth $z_i$, respectively $z_j$ between their initial position and their final position at the end of the duration T, this difference being within the interval $[0,Z_1-1]$ for the first one and 0 and $[0,Z_j-1]$ for the second one, and the second step consists, for at least one integer value between 0 and $P_{max}$ with:

$$P\text{max} = \frac{LCM(Z_i, i \in \{1, 2, \ldots, n\})}{Z_j} - \frac{LCM(Z_i, i \in \{1, 2, \ldots, n\})}{Z_i}$$

either in calculating the number of revolutions ki the first wheel $D_i$ turned of as a function of the difference $(Z_j-Z_i)$ between the values of the number of teeth of the first and second wheels $D_i,D_j$ and of the difference $(z_i-z_j)$ between the differences counted, for each wheel between the initial position and the final position of the wheel, and then calculating the number of events which occurred during the duration T from the following formula:

$$N=k_i \cdot Z_i+z_i$$

or in calculating the number of events which occurred during the duration T from the following formulae:

$$N = \left(\frac{z_i - z_j - p \cdot Z_j}{Z_j - Z_i}\right) \cdot Z_i + z_i.$$

3. The method according to claim 1, further comprising an intermediary step between the first step and the second step, the intermediary step consisting in calculating the number of revolutions performed by each wheel from the values $z_i$ and $z_j$ and the difference between the values $Z_i$ and $Z_j$.

4. The method according to claim 1, wherein the method is implemented by a mechanical counter having only two toothed wheels $D_1$ and $D_2$, further comprising a step for calculating the number of events which occurred from one of the following formulae:

$$N=[(z_2-z_1)/(Z_1-Z_2)]*Z_1+z_1$$

$$N=[(z_2-z_1)/(Z_1-Z_2)]*Z_2+z_2.$$

5. The method according claim 1, further comprising:

a step consisting in counting, for each of n toothed wheels $D_1$ to $D_n$, at the end of the duration T, the difference in the number of teeth $z_i$ between the initial position and the final position of the toothed wheel at the end of the duration T, the difference being within the interval $\{0,Z_i-1\}$;

a step consisting in calculating a value $P_{max}$ as:

$$P_{Max} = \frac{LCM(Z_i, i \in \{1, 2, \ldots, n\})}{Z_2} - \frac{LCM(Z_i, i \in \{1, 2, \ldots, n\})}{Z_1}$$

a step consisting, for p=0 to $P_{max}$:

during a first phase, calculating the number of revolutions of the first toothed wheel D1 turned of from the formula:

$$k_1 = \frac{z_1 - z_2 - p \cdot Z_2}{Z_2 - Z_1}$$

during a second phase, for i=2 to N:

calculating $k_i$ from the following formula:

$$k_i = \frac{(k_1 + p) \cdot Z_2 + z_2 - z_i}{Z_i} \quad (5)$$

determining when the value ki is a possible value by meeting the following conditions:

$$\begin{cases} 0 \leq k_i \leq \dfrac{LCM(Z_i, i \in \{1, 2, \ldots, n\})}{Z_i} - 1 \\ E[(k]_i) - k_i = 0 \end{cases} \quad (6)$$

when the value ki is a possible value by meeting the conditions (6), then repeating the second phase for a new value "i" equal to i+1;

when the value ki does not meet the conditions (6), then exiting the "i" loop and repeating the third phase with a new value "p" equal to p+1, when all values ki are possible: exiting the "p" loop and calculating the number of events from the following formula:

$$N = k_1 \cdot Z_1 + z_1 = \left(\frac{z_1 - z_2 - p \cdot Z_2}{Z_2 - Z_1}\right) \cdot Z_1 + z_1,$$

P being the value for which all the ki meet the conditions (6).

6. A mechanical event counter comprising:
at least two toothed wheels, a first toothed wheel $D_i$ comprising $Z_i$ teeth evenly spaced with a pitch $p_i$ and adapted to rotate around a first axis and a second toothed wheel $D_j$ having $Z_j$ teeth evenly spaced with a pitch $p_j$, and configured to rotate around a second axis, each toothed wheel comprising at least one radial mark configured to allow to assign to each tooth of the wheel an order number with respect to this mark; and
a rotation system configured to rotate both toothed wheels by an angle equal to the pitches $p_i$ and $p_j$ of the teeth upon occurrence of an event to be counted,
wherein $p_i$ and $p_j$ are equal and the number of teeth $Z_i$ of the first toothed wheel $D_i$ is different from that $Z_j$ of the second toothed wheel $D_j$ and the greatest common divisor of $Z_i$ and $Z_j$ is different from $Z_i$ or $Z_j$, and
the mechanical event counter is configured to implement
a first step consisting in one of counting, calculating, and estimating, either for each wheel, at the end of the duration T, the difference in the number of teeth $z_i$, respectively $z_j$, between its initial position at time ti and its final position at the end of the duration T, the difference being within the interval $[0,Z_i[$, respectively $[0,Z_j[$, or directly the difference $(z_i-z_j)$ between the differences, the first step being at least partially carried out by one of an optical system requiring the presence on each toothed wheel of at least one mark configured to allow to assign to each tooth of the wheel an order number with respect to the mark, and of a measurement system configured to measure the angular displacement of each of the at least two toothed wheels between the time ti and the time tf and a calculator configured to calculate $z_i$ and $z_j$, respectively, for each of the at least two wheels, from the measured value of the angular displacement of the at least two wheels between the times ti and tf and the number of teeth of the at least two wheels, respectively $Z_i$ and $Z_j$, and
a second step consisting in calculating, with the calculator, and when $z_i$ is different from $z_j$, the number of events which occurred N as a function of the difference between the values $z_i$ and $z_j$ and as a function of at least one of $Z_i$ and $Z_j$.

7. The mechanical event counter according to claim 6, further comprising an optical system.

8. The mechanical event counter according to claim 7, wherein the optical system is one of a magnifying glass, a camera, and a video camera.

9. The mechanical event counter according to claim 7, further comprising a processor configured to process signals issued by the optical system.

10. The mechanical event counter according of claim 6, wherein the rotating system rotates the first toothed wheel $D_i$ by a first gear-type link and the first toothed wheel rotates the second toothed wheel by a second gear-type link.

11. The mechanical event counter according to claim 6, further comprising:
a first rotation system configured to rotate the first toothed wheel $D_i$, and a first non-return system of the first toothed wheel; and
a second rotation system configured to rotate the second toothed wheel $D_j$, and a second non-return system of the second toothed wheel.

12. The mechanical event counter according to claim 11, wherein the measurement system comprises a first measurement system configured to measure the angular displacement of the lower wheel and second measurement system configured to measure the angular difference between the angular position of the upper wheel with respect to the lower wheel.

13. The mechanical event counter according to claim 6, wherein the first and second axes of the toothed wheels $D_i$ and $D_j$ are one of collinear and coincident, the mechanical event counter comprising at least two superimposed wheels.

14. A mechanical event counter comprising:
at least two toothed wheels, a first toothed wheel $D_i$ comprising $Z_i$ teeth evenly spaced with a pitch $p_i$ and adapted to rotate around a first axis and a second toothed wheel $D_j$ having $Z_j$ teeth evenly spaced with a pitch $p_j$, and configured to rotate around a second axis;
a rotation system configured to rotate both toothed wheels by an angle equal to the pitches $p_i$ and $p_j$ of the teeth upon occurrence of an event to be counted; and
a measurement system configured to measure the angular displacement of each of the at least two wheels,
wherein $p_i$ and $p_j$ are equal and the number of teeth $Z_i$ of the first toothed wheel $D_i$ is different from that $Z_j$ of the second toothed wheel $D_j$, and the greatest common divisor of $Z_i$ and $Z_j$ is different from $Z_i$ or $Z_j$, and
the mechanical event counter is configured to implement
a first step consisting in one of counting, calculating, and estimating, either for each wheel, at the end of the duration T, the difference in the number of teeth $z_i$, respectively $z_j$, between its initial position at time ti and its final position at the end of the duration T, the difference being within the interval $[0,Z_i[$, respectively $[0,Z_j[$, or directly the difference $(z_i-z_j)$ between the differences, the first step being at least partially carried out by one of an optical system requiring the presence on each toothed wheel of at least one mark configured to allow to assign to each tooth of the wheel an order number with respect to the mark, and of the measurement system configured to measure the angular displacement of each of the at least two toothed wheels between the time ti and the time tf and a calculator configured to calculate $z_i$ and $z_j$, respectively, for each of the at least two wheels, from the measured value of the angular displacement of the at least two wheels between the times ti and tf and the number of teeth of the at least two wheels, respectively $Z_i$ and $Z_j$, and
a second step consisting in calculating, with the calculator, and when $z_i$ is different from $z_j$, the number of events which occurred N as a function of the difference between the values $z_i$ and $z_j$ and as a function of at least one of $Z_i$ and $Z_j$.

15. The mechanical event counter according to claim 14, wherein the measurement system configured to measure the angular displacement of each of the at least two wheels is one of resistive, capacitive or magnetic type.

16. The mechanical event counter according to claim 15, wherein one of the first and second toothed wheels $D_i$, $D_j$ comprises one of numerical and colored indications allowing to determine the angular position of one the first and second toothed wheels $D_i$, $D_j$ while the other of the first and second toothed wheels $D_i$, $D_j$ comprises an opening on part of a sector, the opening making part of said numerical or colored indications visible.

* * * * *